(12) United States Patent
Newbold

(10) Patent No.: US 12,077,302 B2
(45) Date of Patent: Sep. 3, 2024

(54) CONDUCTIVE TOUCH-FASTENERS FOR SENSORS IN PASSENGER SEATS

(71) Applicant: Safran Seats USA LLC, Gainesville, TX (US)

(72) Inventor: Tyler L. Newbold, Sherman, TX (US)

(73) Assignee: SAFRAN SEATS USA LLC, Gainesville, TX (US)

(*) Notice: Subject to any disclaimer, the term of this patent is extended or adjusted under 35 U.S.C. 154(b) by 349 days.

(21) Appl. No.: 17/435,651

(22) PCT Filed: Apr. 1, 2019

(86) PCT No.: PCT/US2019/025181
§ 371 (c)(1),
(2) Date: Sep. 1, 2021

(87) PCT Pub. No.: WO2020/197568
PCT Pub. Date: Oct. 1, 2020

(65) Prior Publication Data
US 2022/0144437 A1    May 12, 2022

Related U.S. Application Data

(60) Provisional application No. 62/823,196, filed on Mar. 25, 2019.

(51) Int. Cl.
*B64D 11/06* (2006.01)
*B60N 2/00* (2006.01)
(Continued)

(52) U.S. Cl.
CPC .......... *B64D 11/0624* (2014.12); *B60N 2/002* (2013.01); *B60N 2/0033* (2023.08);
(Continued)

(58) Field of Classification Search
CPC ............ B64D 11/0624; B64D 11/0631; B60N 2/0033; B60N 2/0027; B60N 2/002
See application file for complete search history.

(56) References Cited

U.S. PATENT DOCUMENTS 4,909,560 A    3/1990   Ginn
5,810,392 A    9/1998   Gagnon
(Continued)

FOREIGN PATENT DOCUMENTS

DE    102006039504 A1    2/2008
EP         3061465 A1    8/2016
(Continued)

OTHER PUBLICATIONS

International Patent Application No. PCT/US2019/025181, International Search Report and Written Opinion, dated Dec. 13, 2019.
(Continued)

*Primary Examiner* — Timothy J Brindley
(74) *Attorney, Agent, or Firm* — Kilpatrick Townsend & Stockton LLP

(57) ABSTRACT

Described are passenger seat assemblies that include a passenger seat frame (212), a first passenger seat element (224) connected with the passenger seat frame, and a second passenger seat element (226) configured to removably connect with the first passenger seat element. Each of the first and second passenger seat elements includes a respective conductive touch fastener (228, 232) that, together, complete a circuit when the second passenger seat element is connected with the first passenger seat element. The circuit can be used as a sensor to determine whether the first and second passenger seat elements are connected.

20 Claims, 5 Drawing Sheets

(51) Int. Cl.
    *B60N 2/02*         (2006.01)
    *B60N 2/70*         (2006.01)

(52) U.S. Cl.
    CPC ......... *B60N 2/0272* (2023.08); *B60N 2/7005* (2013.01); *B64D 11/0638* (2014.12); *B64D 11/064* (2014.12); *B64D 11/0647* (2014.12)

(56) References Cited

U.S. PATENT DOCUMENTS

| | | | | |
|---|---|---|---|---|
| 5,990,799 | A * | 11/1999 | Boon | H01H 3/141 |
| | | | | 338/114 |
| 6,929,218 | B1 * | 8/2005 | Sanford | B64D 11/00155 |
| | | | | 297/180.14 |
| 8,646,837 | B2 | 2/2014 | Bovelli et al. | |
| 11,491,895 | B2 * | 11/2022 | Mizoi | A61B 5/6893 |
| 11,541,785 | B2 * | 1/2023 | Sugiyama | B60N 2/64 |
| 2002/0190874 | A1 | 12/2002 | Tokunaga et al. | |
| 2003/0080734 | A1 | 5/2003 | Hedayat et al. | |
| 2003/0169033 | A1 | 9/2003 | Tromblee et al. | |
| 2004/0004474 | A1 | 1/2004 | Kojima et al. | |
| 2004/0195875 | A1 | 10/2004 | Skelly | |
| 2004/0251723 | A1 | 12/2004 | Endo et al. | |
| 2009/0079248 | A1 | 3/2009 | Keyser et al. | |
| 2009/0243868 | A1 | 10/2009 | Wentland et al. | |
| 2010/0219813 | A1 | 9/2010 | Ito et al. | |
| 2011/0043010 | A1 | 2/2011 | Diemer et al. | |
| 2011/0089737 | A1 | 4/2011 | Tscherbner et al. | |
| 2011/0148173 | A1 | 6/2011 | Westerink et al. | |
| 2012/0217779 | A1 | 8/2012 | Gaither et al. | |
| 2012/0226418 | A1 | 9/2012 | Veen et al. | |
| 2016/0001683 | A1 | 1/2016 | Bohlke et al. | |
| 2016/0031560 | A1 | 2/2016 | Zheng et al. | |
| 2016/0250362 | A1 | 9/2016 | Mackin | |
| 2022/0097571 | A1 | 3/2022 | Petit et al. | |
| 2022/0176850 | A1 | 6/2022 | Kulhawik et al. | |
| 2022/0198889 | A1 | 6/2022 | Meinert et al. | |

FOREIGN PATENT DOCUMENTS

| | | | | |
|---|---|---|---|---|
| EP | 3453618 | A1 | 3/2019 | |
| FR | 2944485 | A1 | 10/2010 | |
| FR | 3058124 | A1 | 5/2018 | |
| GB | 2292676 | A | 3/1996 | |
| WO | 2013119713 | A1 | 8/2013 | |
| WO | 2016124840 | A1 | 8/2016 | |
| WO | WO-2018234667 | A1 * | 12/2018 | ........... A47C 31/126 |
| WO | 2020197567 | A1 | 10/2020 | |

OTHER PUBLICATIONS

U.S. Appl. No. 17/442,044, Non-Final Office Action, Jan. 3, 2024, 12 pages.

* cited by examiner

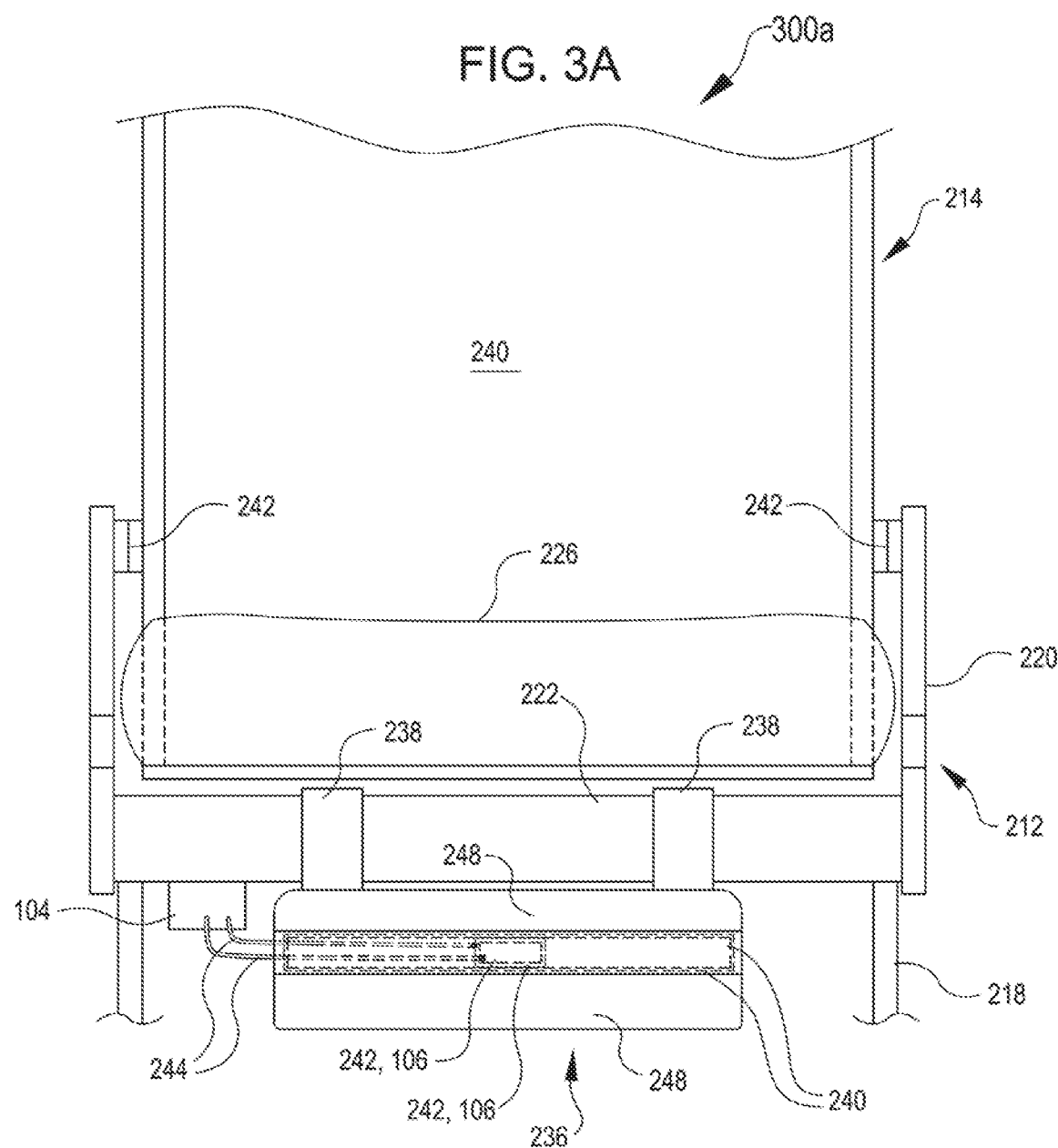

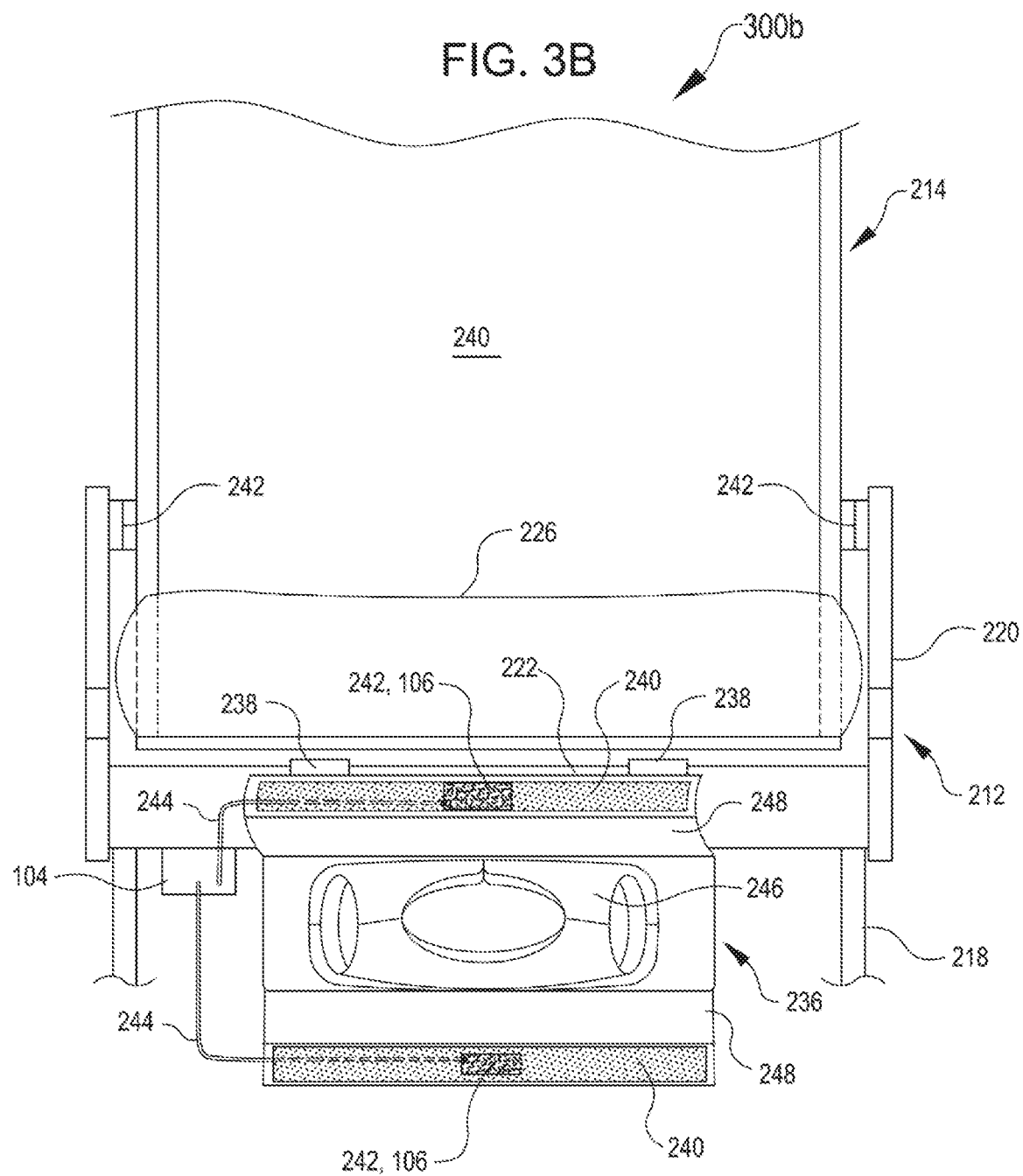

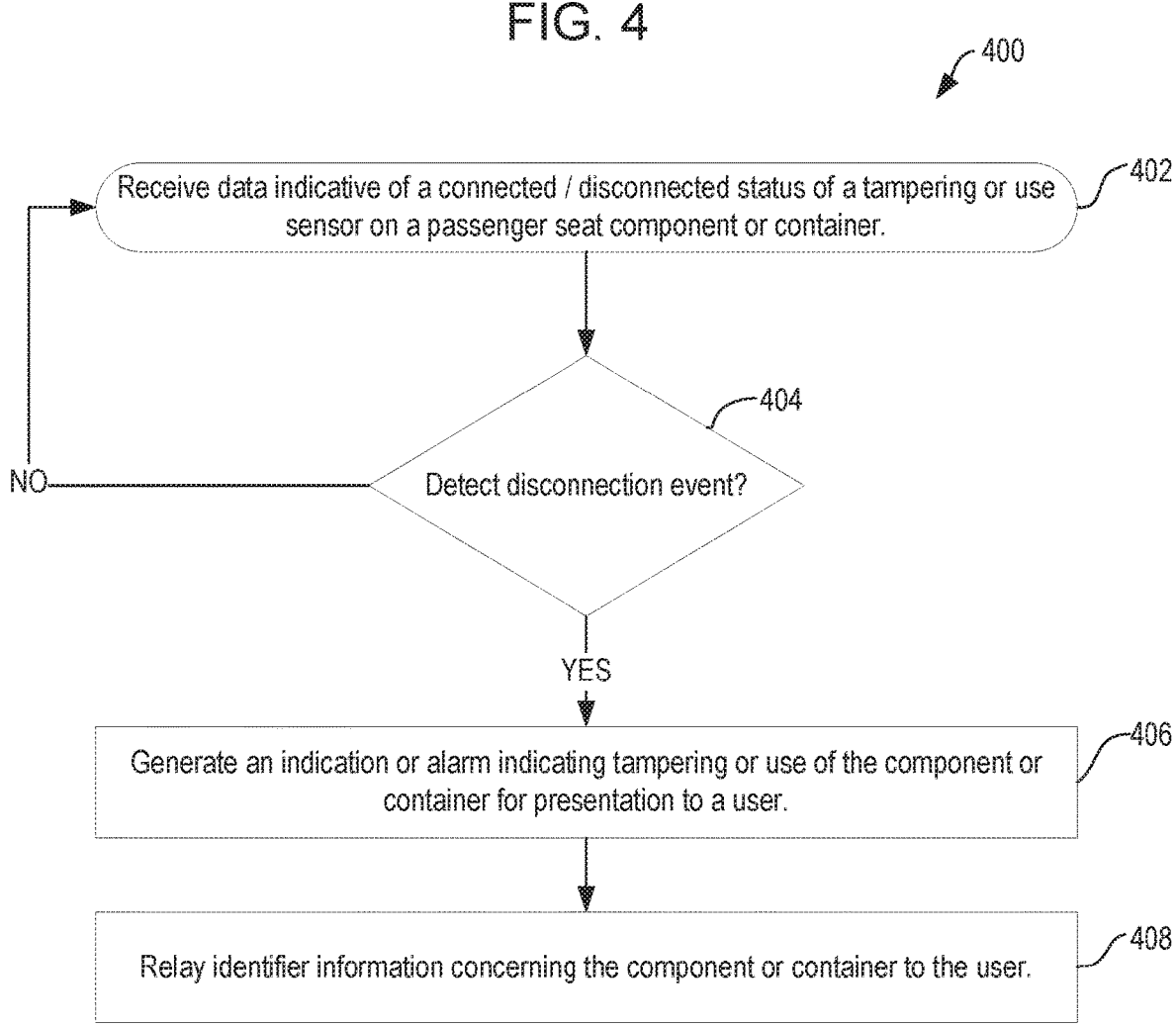

CONDUCTIVE TOUCH-FASTENERS FOR SENSORS IN PASSENGER SEATS

CROSS REFERENCE TO RELATED APPLICATIONS

This application is related to and claims priority benefits from U.S. Provisional Application Ser. No. 62/823,196 ("the '196 application"), filed on Mar. 25, 2019 entitled IMBEDDED SENSORS FOR AIRCRAFT PASSENGER SEATS. The '196 application is hereby incorporated in its entirety by this reference.

FIELD OF THE INVENTION

The field of the invention relates to passenger seats.

BACKGROUND

In commercial aircraft, seats are designed to meet the needs of passenger safety, while accounting for strict limitations on weight and space. To that end, passenger seats include a variety of removable safety features such as, but not limited to, flotation devices for provision to passengers in the event of emergency, including both stowed flotation devices and buoyant portions of the passenger seat. There is also an interest in modernizing the internal sensing systems of aircraft so that crew can quickly ascertain whether such devices are correctly positioned or whether they have been subject to tampering, and even to extend sensors into soft seat elements (such as seat cushions) in order to, e.g., determine whether passengers are seated. However, these interests can conflict, as the increased wiring conventionally required for extending sensors into passenger compartments can clutter or impede access to safety devices. To that end, improved solutions for extending sensors to removable passenger safety features are needed.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a passenger seat assembly can include a passenger seat with a seat frame, a first passenger seat element connected with the passenger seat frame, and a removable passenger seat element configured to removably connect with the first passenger seat element. The first and second passenger seat elements can each include conductive touch fasteners that are positioned such that, when the second passenger seat element is in contact with the first passenger seat element, the first and second conductive touch fasteners complete a circuit. In some embodiments, e.g. where the first passenger seat element is a seat bottom pan, the seat bottom pan can have an attached pair of first conductive touch fasteners that are positioned to mate with a pair of second conductive touch fasteners on an underside of a seat bottom cushion. The second pair of conductive touch fasteners on the seat bottom cushion are electrically connected with each other so that, to including the second conductive touch fastener, that are electrically connected to each other so that, when the seat bottom cushion is placed on the seat bottom pan, the pairs of conductive touch fasteners complete the circuit.

According to at least some embodiments, the first and second passenger seat elements can include additional temporary or touch fasteners that connect the elements together. In use, the conductive touch fasteners permit the second, removable passenger seat element to be easily removable, while still capable of completing a circuit when connected with the first passenger seat element. This circuit can be used to monitor whether the removable passenger seat element is connected with the first passenger seat element, for providing power to one or more sensors embedded in or otherwise connected with the removable passenger seat element, or for both uses.

According to at least some embodiments, the first and passenger seat elements can include closures or flaps of a container connected with the passenger seat frame, e.g., the first passenger seat element including a first closure of the container and the second passenger seat element including a second closure of the container. When the container is opened, conductive touch fasteners of the first and second closures are separated, breaking the circuit. Suitable containers can include, but are not limited to, flotation device pouches or equipment containers mounted to the passenger seat frame.

According to certain embodiments of the present invention, systems for detecting a status of a removable passenger seat element can include any of the aforementioned passenger seat assemblies, with the addition of a controller operable to monitor the circuit (or circuits, for assemblies of multiple or potentially many passenger seats). Such a controller can receive a signal from each respective circuit in order to detect whether any removable second passenger seat element has been disconnected from a respective first passenger seat element based on the signal. The system may be used to monitor whether containers have been opened or tampered with, e.g., where the respective first and second passenger seat elements include closures of containers. The system may be used to monitor whether removable passenger seat bottom cushions have been removed as well, e.g., where the first passenger seat elements include seat bottom pans, and the second passenger seat elements include removable seat bottom cushions. When the pairs of conductive touch fasteners, on a respective seat bottom pans and seat bottom cushion are disconnected, the system can detect the disconnection and optionally generate an indication for a user (e.g., cabin crew, flight crew) indicating the disconnection, which may also include indicating which seat bottom cushion or cushions have been removed.

According to certain embodiments of the present inventions, methods of detecting a status of a passenger seat element can include receiving, at a controller, a signal from a circuit in a passenger seat as described above, and determining based on the signal that a removable passenger seat element has been disconnected or removed. For embodiments where the removable passenger seat element is a closure of a container connected with the passenger seat, the methods can include detecting when the container is opened by detecting that a circuit formed by the connection of conductive touch fasteners in the closure has been disconnected. For embodiments where the removable passenger seat element is a passenger seat bottom cushion containing a circuit therein, the method scan include determining that the seat bottom cushion has been removed by detecting that a circuit formed by connection of the passenger seat bottom with the seat bottom pan by two pairs of conductive touch fasteners has been broken.

BRIEF DESCRIPTION OF THE DRAWINGS

FIG. 3A is a front view illustrating aspects of the passenger seating arrangement shown in FIG. 2 with attention to a removable safety device container in a closed configuration.

FIG. 3B is a front view illustrating aspects of the passenger seating arrangement shown in FIG. 3A with attention to the removable safety device container in an open configuration.

FIG. 4 illustrates an example process for monitoring a status of a removable passenger seat element.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide for passenger seating arrangements having passenger seats with embedded sensors for monitoring, among other things, whether removable passenger safety devices have been removed or tampered with, and for powering embedded sensors in passenger safety devices. While the improved seating arrangements and passenger seat assemblies are discussed for use with aircraft seats, they are by no means so limited. Rather, embodiments of the passenger seats and seating arrangements may be used in passenger seats or other seats of any type or otherwise as desired. In some embodiments, embedded sensors may communicate with a control system including, e.g., local and/or central controllers that can provide information to a cabin crew, engineer, or flight crew for detecting aspects of the orientations or stowed/deployed status of passenger seat elements.

Figure 1:
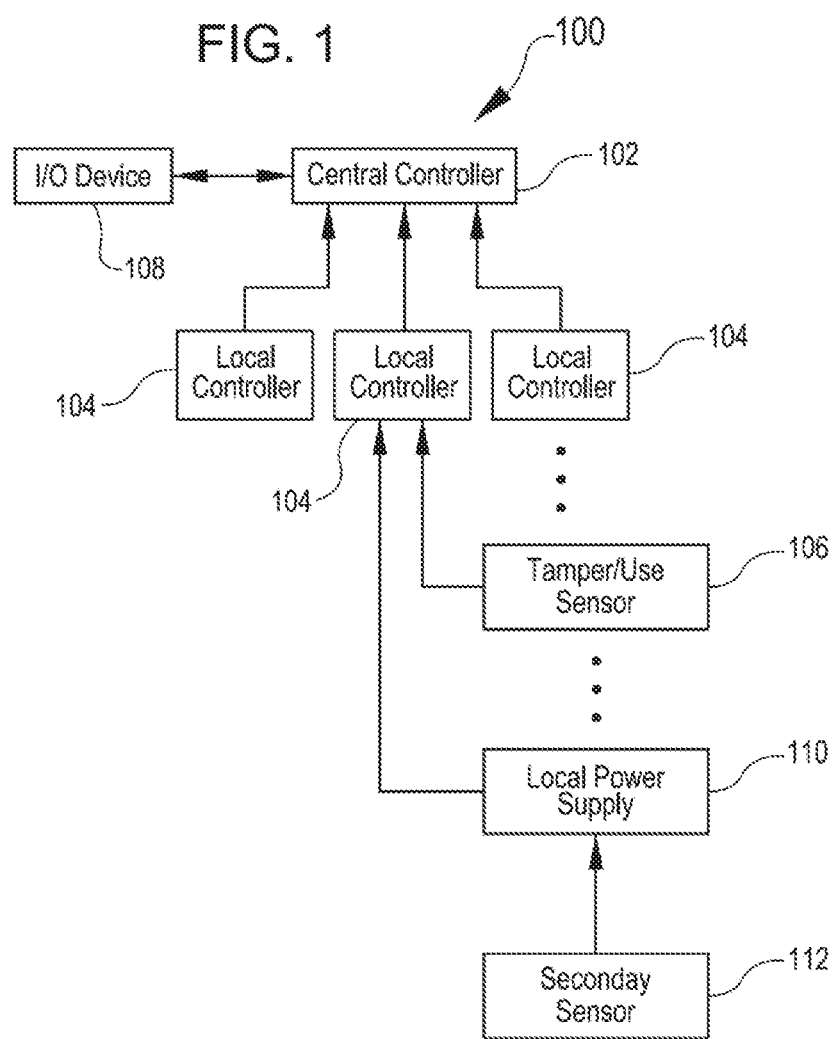
FIG. 1 is a simplified block diagram illustrating a system for monitoring removable passenger seat safety devices via embedded sensors, according to various embodiments of the present disclosure.

According to certain embodiments of the present disclosure, as shown in FIG. 1, a passenger seating control system 100 can include any suitable number of tampering/use sensors 106, which can be installed in elements of passenger seats for detecting whether the safety device has been removed, opened, or tampered with. In one embodiment of the system 100, any suitable number of sensors 106 may be operably or electrically connected with a local controller 104. Connections for reading data from sensors 106 can be wired, can be wireless (e.g., using RF or other wireless communication techniques), or can use a combination of wire and conductive thread or printed circuitry in the seat components.

According to some embodiments, each local controller 104 may connect with a central controller 102 in order to communicate status information to the central controller regarding readings from any number of the sensors 106. For example, the sensors 106 may detect whether removable flotation devices have been removed from the passenger seat, or whether safety device containers have been opened. In such embodiments, the central controller 102 may collect information from the various sensors 106 indicative of the status of the aforementioned components, either directly or via any suitable number of intermediate local controllers 104, and then communicate that information to a user (e.g., cabin crew, flight crew, engineer) by way of a user input/output (IO) device 108, which might be any suitable display and/or communication device such as a computer terminal, mobile device, or similar IP device.

According to some embodiments, each local controller 104 (or alternatively, central controller 102) can be electrically connected with and provide power to secondary sensors 112 embedded in passenger seat components. For example, in some embodiments, secondary sensors such as pressure or load sensors can be embedded in passenger seat cushions. A local power supply 110, such as a rechargeable battery, may be included in-line with any such secondary sensors 112. The system 100 may detect whether tampering or removal of a component has occurred by detecting whether a signal is received from a secondary sensor 112 indicative that the secondary sensor remains connected with the local controller 104, wherein removal of the component in which the sensor is embedded would cause the secondary sensor to be disconnected.

Figure 2:
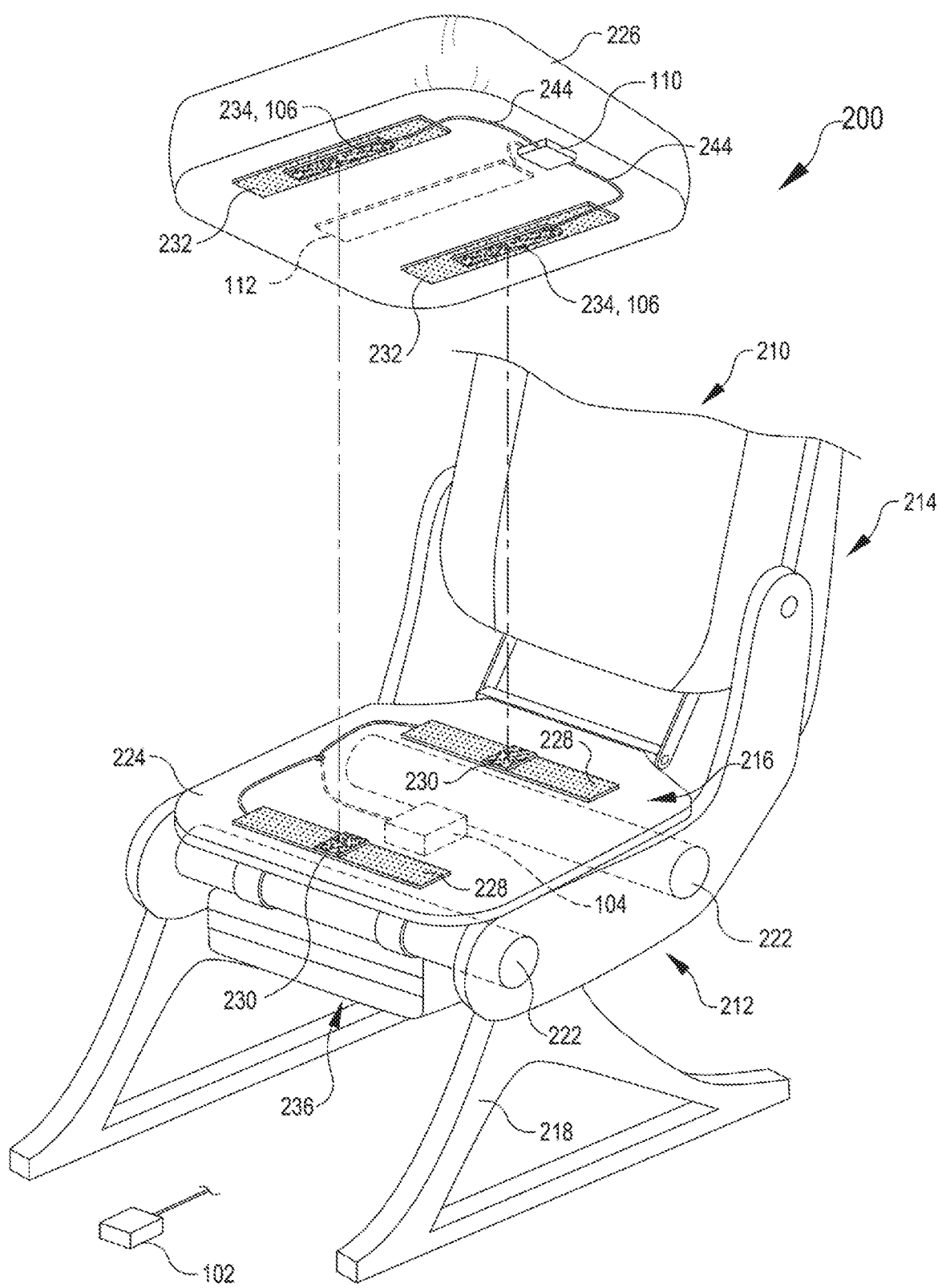
FIG. 2 is a perspective view showing an example of a passenger seat assembly having imbedded sensors in removable safety devices, according to various embodiments of the present disclosure.

As illustrated in FIG. 2, a passenger seating arrangement 200 can include at least one passenger seat assembly 210, and typically several passenger seat assemblies connected together. Each passenger seat assembly 210 can include a seat frame 212, seat bottom assembly 216 connected with the seat frame, and a seat back assembly 214 connected with the seat frame. The seat frame 212 includes several supporting structures, generally a base frame 218 that can connect with the floor of a passenger compartment and seat frame tubes 222 that connect with the base frame and support the seat bottom assembly 216 and seat back as. The seat bottom assembly 216 includes at least a seat bottom pan 224 and a seat bottom cushion 226, and generally includes additional features for permitting the seat bottom assembly to articulate, to lock in position, or to perform other functions. The seat bottom pan 224 is shown herein as a planar element, but may be configured in a variety of shapes and sizes to meet various design criteria.

According to various embodiments, the seat bottom cushion 226 can be removably connected with the seat bottom pan 224 by touch fasteners 228 connected to the seat bottom pan, and touch fasteners 232 connected to an underside of the seat bottom cushion 226. Suitable touch fasteners (228, 232) can include, but are not limited to, matching hook-and-loop panels or strips, hook-and-pile fasteners, or similar. According to some alternative embodiments, touch fasteners 228, 232 can be replaced by alternative removable fasteners, e.g., weak or temporary adhesives, magnetic fixtures, deformable connectors, or other suitable removable fasteners.

The seat bottom cushion 226 can include a buoyant material as cushioning, e.g. a closed-cell foam, enclosed gas pocket, or other comparable buoyant element. Thus, the seat bottom cushion being readily removable from the seat bottom pan 224 by a passenger is an important safety feature that can provide passengers with flotation devices in the event of emergency. However, even for seat bottom cushions that are not buoyant, removability can be an important design feature, as seat bottom cushions can require maintenance and replacement at different rates than the underlying hard structures, and removability provides for economical and efficient replacement.

According to some embodiments, the seat bottom cushion 226 can include one or more sensors 112 or other electronic devices therein, such as but not limited to pressure sensors, transponders or location equipment, identification devices, or the like. For example, pressure sensors can be used in conjunction with a cabin monitoring system (e.g. system 100) to detect whether a passenger is seated at any given seat, which can be used for determining actual headcount, load balance, or other passenger attributes. Transponders and locating equipment may be used to facilitate detection of removed seat bottom cushions, e.g., in the event that the seat bottom cushions have been used in an emergency. Identification devices may be used for facilitating maintenance tasks or the like. Any device or sensor 112 located in the seat bottom cushion may be configured to draw power from, e.g., power supply 110 located in the seat cushion, or may draw line power from an external supply.

In addition to touch fasteners 228 on the seat bottom pan 224, the passenger seat assembly 210 can include conductive touch fasteners 230 that are positioned to mate with opposing, conductive touch fasteners 234 on the underside of the seat bottom cushion 226. The conductive pairs of touch fasteners 230, 234 can, when the seat bottom cushion 226 is connected with the seat pan 224, close a circuit (e.g., by conductive thread 244, or by conventional wiring) that provides power from the local controller 104 to electronic devices or sensors in the seat bottom cushion. For example, in embodiments having secondary sensors 112, the conductive pairs of touch fasteners 230, 234 can provide power for the secondary sensors. In embodiments having a seat bottom cushion power supply 110, conductive touch fasteners 230, 234 can transmit power to charge the power supply. Conductive touch fasteners 230, 234 can include, e.g., metallic or partially metallic hook-and-loop type fasteners, or any other suitable touch fastener capable of conducting charge while providing a releasable structural connection.

According to some embodiments, the assembly of the paired conductive touch fasteners 230, 234 creating a circuit that can act as a tampering/use sensor 106, whereby a cabin monitoring system (e.g. system 100) can sense whether the seat bottom cushion 226 is attached to the seat bottom pan 224 by sensing whether the circuit is connected or disconnected. This use of the conductive touch fasteners 230, 234 to detect whether the seat bottom cushion 226 is attached can be conducted with or without secondary sensor 112.

In use, sensor 106 or secondary sensor 112 can communicate status information to a central controller 102, either directly or via local controller 104. Conductive touch fasteners can be used in conjunction with a cabin monitoring system (e.g. system 100) to monitor the status of a variety of removable features, and even a variety of soft structures that use removable closures. For example, conductive touch fasteners can be used to detect opening, tampering, or use of flotation device pouch 236.

FIG. 3A is a front view illustrating aspects of the passenger seating arrangement shown in FIG. 2 with attention to the flotation device pouch 236 in a closed or stowed configuration. Flotation device pouch 236 is shown facing forward with respect to the passenger seat assembly 210, but may be installed facing aft. Seat bottom assembly 212 is connected with spreaders 220 that support the seat back assembly 214, which includes a seat back 240 connected to the spreaders by way of seat back hinges 242. As shown, the seat back assembly 214 is aft of the seat bottom cushion 226, but the essential features described herein can be reversed without departing from the spirit of the disclosure.

The flotation device pouch 236 is preferably a container composed of polymer, fabric, nylon, or other suitable material, connected with the seat bottom assembly 212. According to some embodiments, the flotation device pouch 236 is a bag that can hang suspended from straps 238 attached to the seat bottom assembly 212, with flaps 248 that can open to expose a flotation device inside the pouch. Note, however, that the flotation device pouch 236 can be substituted for a variety of soft-sided containers suitable for holding a variety of different safety equipment, such as but not limited to: first-aid kits, lights, supplies, tools, or the like. The flaps 248 can be connected together by way of touch fasteners 240, which can include any suitable form of touch fastener as described above. In addition to touch fasteners 240, the flaps 248 are at least partly connected together by way of conductive touch fasteners 242, which can include any suitable metallic or partially metallic hook-and-loop type fasteners, or any other suitable touch fastener capable of conducting charge while providing a releasable structural connection.

In use, the conductive touch fasteners 242 can be electrically connected with local controller 104 by way of wires, conductive thread, or a combination of the above. FIG. 3B is a front view illustrating aspects of the passenger seating arrangement shown in FIG. 3A with attention to the flotation device pouch 236 in an open or deployed configuration, revealing the stored flotation device 246 (or, alternatively, other stored equipment). The electrical circuit formed by the conductive touch fasteners 242 effectively forms a tampering/use sensor 106. In conjunction with a cabin monitoring system (e.g. system 100, FIG. 1), the tampering/use sensor 106 can detect whether the flotation device pouch 236 is intact or whether the pouch has been opened by monitoring the electrical conductivity of the circuit closed by the conductive touch fasteners 242. In some embodiments, the system 100 can record incidents where the flotation device pouch 236 has been opened, and can generate an indication identifying the opened pouch with each such event, so that crew can be alerted to check on flotation device pouches 236 that may have been subject to tampering.

FIG. 4 illustrates a first process 400 for utilizing tampering/use sensors 106, in accordance with various embodiments and in conjunction with the cabin monitoring system 100 (FIG. 1) and passenger seating arrangement 200 (FIGS. 2-3B) described above. In the process 400, the system can receive data indicative of a connected/disconnected status of a tampering or use sensor on a passenger seat component or container (act 402). This data can be, for example, simple voltage, resistance, or other suitable reading indicative of the state of a circuit that includes conductive touch-fasteners on the passenger seat component or container. If the system detects a disconnection event, e.g. a change in voltage or resistance indicative that the circuit has been broken (act 404), the system can proceed to logging the event in nonvolatile memory and/or generating an indication for presentation to a user, such as cabin or flight crew, indicative of the disconnection event (act 406). The system can, in addiction, relay information about the specific component or container associated with the affected sensor, for example, whether the sensor indicates that a seat bottom cushion was removed, whether an equipment container or pouch was opened, etc., along with identifying information to locate the associated passenger seat assembly.

In the following, further examples are described to facilitate the understanding of the invention:

Example A: A passenger seat assembly, comprising: a passenger seat comprising a passenger seat frame; a first passenger seat element connected with the passenger seat frame and comprising a first conductive touch fastener; and a second passenger seat element configured to removably connect with the first passenger seat element, the second passenger seat element comprising a second conductive touch fastener that is positioned such that, when the second passenger seat element is in contact with the first passenger seat element, the first and second conductive touch fasteners complete a circuit.

Example B: The passenger seat assembly of example A, wherein: the first passenger seat element comprises a seat bottom pan, the seat bottom pan comprising a pair of first conductive touch fasteners, including the first conductive touch fastener; and the second passenger seat element comprises a removable seat bottom cushion comprising a pair of second conductive touch fasteners, including the second conductive touch fastener, that are electrically connected to each other, wherein the first pair of conductive touch fasteners and second pair of conductive touch fasteners are spaced to contact each other and complete the circuit when the removable seat bottom cushion is positioned on the seat bottom pan.

Example C: The passenger seat assembly of example B, wherein: the seat bottom pan further comprises a first nonconductive touch fastener; and the removable seat bottom cushion further comprises a second nonconductive touch fastener configured to removably attach to the first nonconductive touch fastener when the removable seat bottom cushion is attached with the seat bottom pan.

Example D: The passenger seat assembly of example B or example C, wherein the removable seat bottom cushion further comprises a sensor embedded therein and connected with the circuit.

Example E: The passenger seat assembly of example D, wherein the sensor comprises a pressure sensor.

Example F: The passenger seat assembly of example A, further comprising a container connected with the passenger seat frame, wherein the first passenger seat element comprises a first closure of the container and the second passenger seat element comprises a second closure of the container.

Example G: The passenger seat assembly of example F, wherein the container comprises a flotation device pouch mounted to the passenger seat frame.

Example H: The passenger seat assembly of any of the preceding examples, further comprising a controller electrically connected with one of the first or second conductive touch fasteners and configured to detect whether the circuit is connected or disconnected.

Example I: A system for detecting a status of a removable passenger seat element, the system comprising: a passenger seat comprising a passenger seat frame; a first passenger seat element connected with the passenger seat frame and comprising a first conductive touch fastener; a second passenger seat element configured to removably connect with the first passenger seat element, the second passenger seat element comprising a second conductive touch fastener that is positioned such that, when the second passenger seat element is in contact with the first passenger seat element, the first and second conductive touch fasteners complete a circuit; and a controller comprising a processor and non-volatile memory containing instructions that, when executed by the processor, cause the controller to: receive a signal from the circuit; and detect whether the second passenger seat element has been disconnected from the first passenger seat element based on the signal.

Example J: The system of example I, further comprising a container connected with the passenger seat, wherein: the first passenger seat element comprises a first closure of the container and the second passenger seat element comprises a second closure of the container such that, when the container is opened, the circuit is disconnected; and the controller is further configured to detect whether the container has been opened based on the signal.

Example K: The system of example I, wherein: the first passenger seat element comprises a seat bottom pan, the seat bottom pan comprising a pair of first conductive touch fasteners, including the first conductive touch fastener; and the second passenger seat element comprises a removable seat bottom cushion comprising a pair of second conductive touch fasteners, including the second conductive touch fastener, that are electrically connected to each other, wherein the first pair of conductive touch fasteners and second pair of conductive touch fasteners are spaced to contact each other and complete the circuit when the removable seat bottom cushion is positioned on the seat bottom pan.

Example L: The system of example K, wherein the controller is further configured to detect whether the removable seat bottom cushion has been removed from the seat bottom pan based on the signal.

Example M: The system of example K or example L, wherein: the removable seat bottom cushion further comprises a sensor embedded therein, the sensor electrically connected with the circuit; and the controller is further configured to receive data from the sensor embedded in the removable seat bottom cushion.

Example N: The system of example M, wherein the sensor comprises a pressure sensor.

Example O: The system of any of the preceding examples, further comprising: a plurality of passenger seats, including the passenger seat, comprising a respective plurality of passenger seat frames; a plurality of first passenger seat elements connected with the passenger seat frames, each first passenger seat element comprising a respective first conductive touch fastener of a plurality of first conductive touch fasteners; and a plurality of second passenger seat elements, each second passenger seat element configured to removably connect with a respective one of the first passenger seat elements, and each second passenger seat element comprising a respective second conductive touch fastener that is positioned such that, when the plurality of first passenger seat elements is assembled with the plurality of second passenger seat elements, the pluralities of first conductive touch fasteners and second conductive touch fasteners form a respective plurality of circuits, each circuit corresponding to one of the plurality of passenger seats; wherein the controller is further configured to: receive a plurality of signals from the plurality of circuits; and detect whether any one of the second passenger seat elements has been disconnected from any corresponding first passenger seat element based on the plurality of signals.

Example P: The system of any of the preceding examples, wherein the controller is further configured to: in response to the detecting, generate an indication, for presentation to a user, that the second passenger seat element has been disconnected from the first passenger seat element.

Example Q: The system of example P, wherein the controller is further configured to: determine, based on the signal, an identifier associated with a location of the second passenger seat element; and generate the indication, for presentation to the user, based on the identifier.

Example R: A method of detecting a status of a passenger seat element, the method comprising: receiving, at a controller, a signal from a circuit in a passenger seat, the circuit comprising a first conductive touch fastener connected with a first passenger seat element, and a second conductive touch fastener connected with a second passenger seat element that is removably attached with the first passenger seat element, the first and second conductive touch fasteners being configured to interact to form the circuit; and determining, based on the signal, whether the second passenger seat element has been removed from the first passenger seat element.

Example S: The method of example R, wherein the first passenger seat element comprises a first closure of a container connected with the passenger seat and the second passenger seat element comprises a second closure of the container such that, when the container is opened, the circuit is disconnected, the method further comprising: detecting, based on the signal, that the container has been opened.

Example T: The method of example R, wherein: the first passenger seat element comprises a seat bottom pan, the seat bottom pan comprising a pair of first conductive touch fasteners, including the first conductive touch fastener; and the second passenger seat element comprises a removable seat bottom cushion comprising a pair of second conductive touch fasteners, including the second conductive touch fastener, that are electrically connected to each other, wherein the first pair of conductive touch fasteners and second pair of conductive touch fasteners are spaced to contact each other and complete the circuit when the removable seat bottom cushion is positioned on the seat bottom pan, the method further comprising: detecting, based on the signal, that the removable seat bottom cushion has been removed from the seat bottom pan.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

The invention claimed is:

1. A passenger seat assembly, comprising:
a passenger seat comprising a passenger seat frame;
a first passenger seat element connected with the passenger seat frame and comprising a first touch fastener and a first conductive touch fastener, wherein the first conductive touch fastener is positioned at a center of the first touch fastener;
a second passenger seat element configured to removably connect with the first passenger seat element, the second passenger seat element comprising a second conductive touch fastener that is positioned such that, when the second passenger seat element is in contact with the first passenger seat element, the first and second conductive touch fasteners complete a circuit; and
a sensor connected with the circuit;
wherein power is supplied to the sensor through the circuit.

2. The passenger seat assembly of claim 1, wherein:
the first passenger seat element comprises a seat bottom pan, the seat bottom pan comprising a pair of first conductive touch fasteners, including the first conductive touch fastener; and
the second passenger seat element comprises a removable seat bottom cushion comprising a pair of second conductive touch fasteners, including the second conductive touch fastener, that are electrically connected to each other, wherein the first pair of conductive touch fasteners and second pair of conductive touch fasteners are spaced to contact each other and complete the circuit when the removable seat bottom cushion is positioned on the seat bottom pan.

3. The passenger seat assembly of claim 2, wherein:
the seat bottom pan further comprises a first nonconductive touch fastener; and
the removable seat bottom cushion further comprises a second nonconductive touch fastener configured to removably attach to the first nonconductive touch fastener when the removable seat bottom cushion is attached with the seat bottom pan.

4. The passenger seat assembly of claim 2, wherein the sensor is embedded in the removable seat bottom cushion and is electrically connected with the circuit.

5. The passenger seat assembly of claim 4, wherein the sensor comprises a pressure sensor.

6. The passenger seat assembly of claim 1, further comprising a container connected with the passenger seat frame, a third passenger seat element comprising a first closure of the container and a third conductive touch fastener, and a fourth passenger seat element comprising a second closure of the container and a fourth conductive touch fastener.

7. The passenger seat assembly of claim 6, wherein the container comprises a flotation device pouch mounted to the passenger seat frame.

8. The passenger seat assembly of claim 1, further comprising a controller electrically connected with one of the first or second conductive touch fasteners and configured to detect whether the circuit is connected or disconnected.

9. A system for detecting a status of a removable passenger seat element, the system comprising:
a passenger seat comprising a passenger seat frame;
a first passenger seat element connected with the passenger seat frame and comprising a first touch fastener and a first conductive touch fastener, wherein the first conductive touch fastener is positioned at a center of the first touch fastener;
a second passenger seat element configured to removably connect with the first passenger seat element, the second passenger seat element comprising a second conductive touch fastener that is positioned such that, when the second passenger seat element is in contact with the first passenger seat element, the first and second conductive touch fasteners complete a circuit; and
a sensor connected with the circuit; wherein power is supplied to the sensor through the circuit;

a controller comprising a processor and non-volatile memory containing instructions that, when executed by the processor, cause the controller to:
receive a signal from the circuit; and
detect whether the second passenger seat element has been disconnected from the first passenger seat element based on the signal.

10. The system of claim 9, further comprising a container connected with the passenger seat, a third passenger seat element comprising a first closure of the container and a third conductive touch fastener, and a fourth passenger seat element comprising a second closure of the container and a fourth conductive touch fastener such that, when the third passenger seat element is in contact with the fourth passenger seat element, the third and fourth conductive touch fasteners complete a second circuit and when the container is opened, the second circuit is disconnected; and
wherein the controller is further configured to receive a second signal from the second circuit and detect whether the container has been opened based on the second signal.

11. The system of claim 9, wherein:
the first passenger seat element comprises a seat bottom pan, the seat bottom pan comprising a pair of first conductive touch fasteners, including the first conductive touch fastener; and
the second passenger seat element comprises a removable seat bottom cushion comprising a pair of second conductive touch fasteners, including the second conductive touch fastener, that are electrically connected to each other, wherein the first pair of conductive touch fasteners and second pair of conductive touch fasteners are spaced to contact each other and complete the circuit when the removable seat bottom cushion is positioned on the seat bottom pan.

12. The system of claim 11, wherein the controller is further configured to detect whether the removable seat bottom cushion has been removed from the seat bottom pan based on the signal.

13. The system of claim 11, wherein:
the sensor is embedded in the removable seat bottom cushion, and is electrically connected with the circuit; and
the controller is further configured to receive data from the sensor embedded in the removable seat bottom cushion.

14. The system of claim 13, wherein the sensor comprises a pressure sensor.

15. The system of claim 9, further comprising:
a plurality of passenger seats, including the passenger seat, comprising a respective plurality of passenger seat frames;
a plurality of first passenger seat elements connected with the passenger seat frames, each first passenger seat element comprising a respective first conductive touch fastener of a plurality of first conductive touch fasteners; and
a plurality of second passenger seat elements, each second passenger seat element configured to removably connect with a respective one of the first passenger seat elements, and each second passenger seat element comprising a respective second conductive touch fastener that is positioned such that, when the plurality of first passenger seat elements is assembled with the plurality of second passenger seat elements, the pluralities of first conductive touch fasteners and second conductive touch fasteners form a respective plurality of circuits, each circuit corresponding to one of the plurality of passenger seats; wherein
the controller is further configured to:
receive a plurality of signals from the plurality of circuits; and
detect whether any one of the second passenger seat elements has been disconnected from any corresponding first passenger seat element based on the plurality of signals.

16. The system of claim 9, wherein the controller is further configured to:
in response to the detecting, generate an indication, for presentation to a user, that the second passenger seat element has been disconnected from the first passenger seat element.

17. The system of claim 16, wherein the controller is further configured to:
determine, based on the signal, an identifier associated with a location of the second passenger seat element; and
generate the indication, for presentation to the user, based on the identifier.

18. A method of detecting a status of a passenger seat element, the method comprising:
receiving, at a controller, a signal from at least one sensor connected with a circuit in a passenger seat, the circuit comprising:
a first touch fastener and a first conductive touch fastener connected with a first passenger seat element, wherein the first conductive touch fastener is positioned at a center of the first touch fastener; and
a second conductive touch fastener connected with a second passenger seat element that is removably attached with the first passenger seat element;
wherein the first and second conductive touch fasteners being configured to interact to form the circuit; and
wherein power is supplied to the at least one sensor through the circuit and
determining, based on the signal, whether the second passenger seat element has been removed from the first passenger seat element.

19. The method of claim 18, wherein the first passenger seat element comprises a first closure of a container connected with the passenger seat and the second passenger seat element comprises a second closure of the container such that, when the container is opened, the circuit is disconnected, the method further comprising:
detecting, based on the signal, that the container has been opened.

20. The method of claim 18, wherein:
the first passenger seat element comprises a seat bottom pan, the seat bottom pan comprising a pair of first conductive touch fasteners, including the first conductive touch fastener; and
the second passenger seat element comprises a removable seat bottom cushion comprising a pair of second conductive touch fasteners, including the second conductive touch fastener, that are electrically connected to each other, wherein the first pair of conductive touch fasteners and second pair of conductive touch fasteners are spaced to contact each other and complete the circuit when the removable seat bottom cushion is positioned on the seat bottom pan, the method further comprising:

detecting, based on the signal, that the removable seat bottom cushion has been removed from the seat bottom pan.

* * * * *